March 25, 1947. H. C. NUNES 2,418,090
TRAILER STEERING MECHANISM
Filed Dec. 19, 1944 2 Sheets-Sheet 1
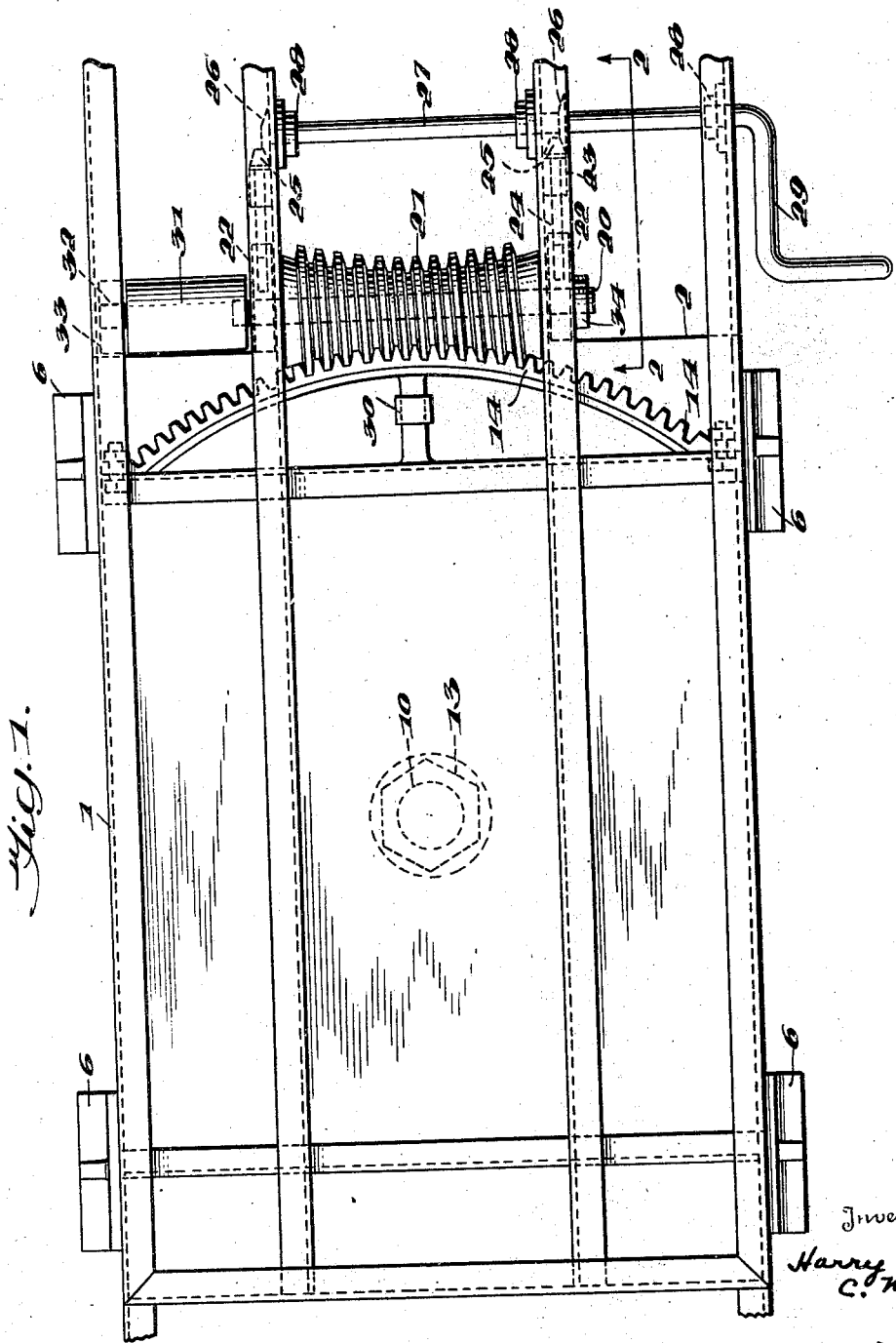
Inventor
Harry C. Nunes

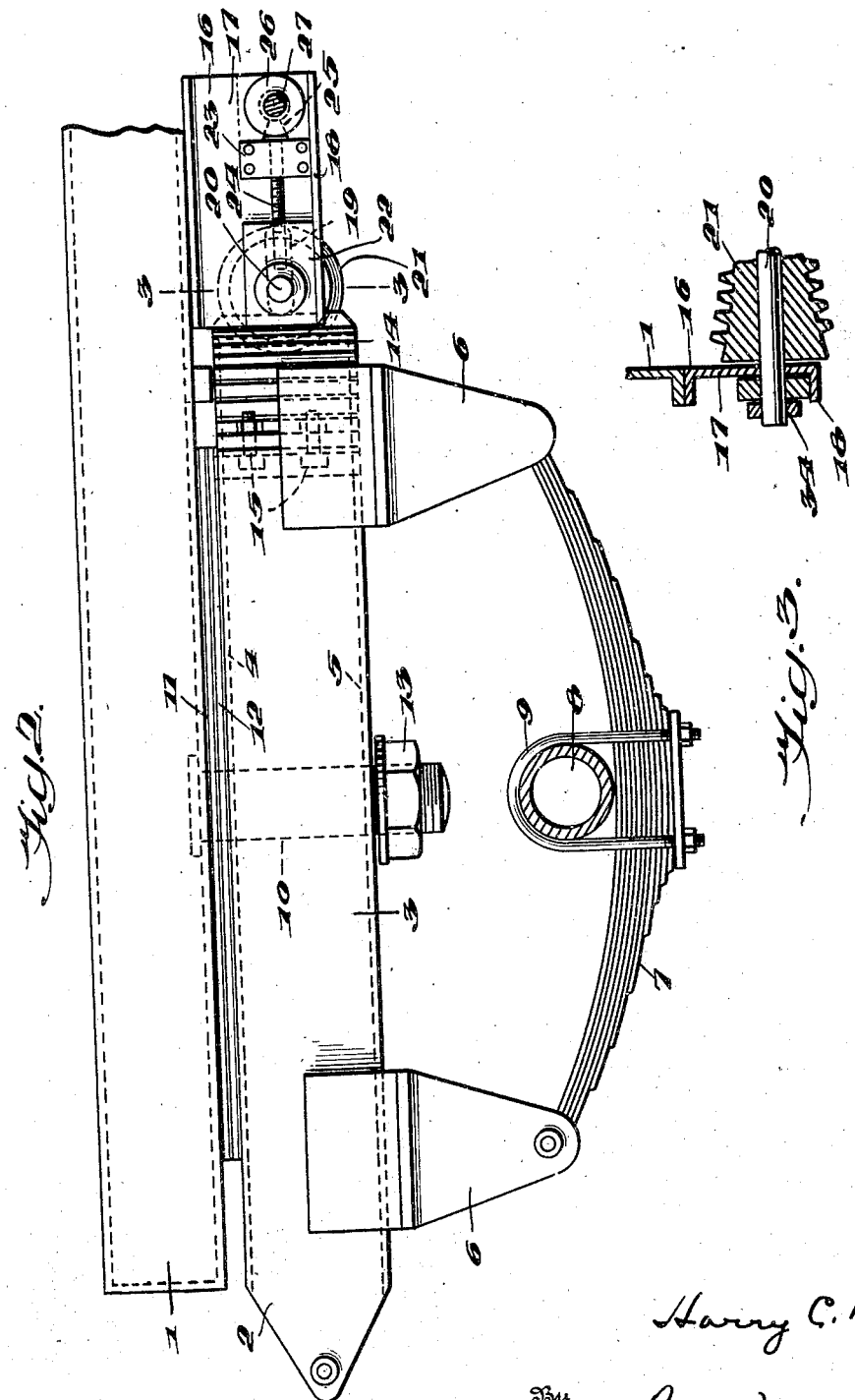

Patented Mar. 25, 1947

2,418,090

UNITED STATES PATENT OFFICE 2,418,090

TRAILER STEERING MECHANISM

Harry C. Nunes, Honolulu, Territory of Hawaii

Application December 19, 1944, Serial No. 568,831

8 Claims. (Cl. 280—98)

My invention relates to steering mechanisms for trailers of automobiles and more particularly to such a mechanism for the trailer body of large capacity which is pivotally connected directly to a power unit.

The principal object of the invention is to provide a simple and rugged steering mechanism which is easily operable from the driver's cab for backing commercial type (freight hauling) trailers and is readily adaptable to trailers now in use.

A primary feature of the invention consists in providing the trailer with a swiveled truck having a quadrant worm gear and in providing a rotatable worm slidably mounted upon the trailer so as to be movable into and out of engagement with the worm gear.

Another feature of the invention consists in providing the trailer with a power operated worm which is readily movable in a direction perpendicular to its axis whereby the worm is selectively movable into and out of engagement with a worm gear mounted on a swiveled truck supporting a part of the trailer.

A further feature of the invention consists in providing a rotatable worm mounted upon a shaft supported in bearings slidably mounted on the trailer which is slidable by manually operated means carried by the trailer whereby the worm may be selectively moved into and out of engagement with a worm gear mounted on a swiveled truck supporting a part of the trailer.

Further and more specific features of the invention, residing in advantageous forms, combinations and relations of parts, will hereinafter appear and be pointed out in the claims.

In the drawings,

Figure 1 is a plan view of one end of the trailer chassis embodying the invention.

Figure 2 is a view partly in side elevation and partly in section of the structure shown in Figure 1, the sectional part of the view being on line 2—2 of Figure 1.

Figure 3 is a detail sectional view taken on line 3—3 of Figure 2.

Referring more particularly to the drawings, 1 indicates a portion of the chassis of a trailer body and 2 a truck or bogie which is pivotally connected to the chassis.

The truck has side frame members 3 which may advantageously be connected by top and bottom plates 4 and 5. Rigidly secured to each of the frame members is a pair of brackets 6 to which the ends of springs 7 are connected. An axle 8 is secured to the springs in any suitable manner, such as by inverted U-shaped clips 9. The pivotal connection between the trailer chassis and the truck advantageously consists of a king pin 10 which extends through openings in engaging plates 11 and 12 respectively secured to the chassis and the truck and which is firmly fastened at its lower end to the truck by a nut 13. Swiveling of the truck with respect to the trailer about the king pin 10 as a center will, of course, cause the plate 12 of the truck to move relatively with respect to the plate 11 of the chassis which is supported thereon. Rigidly secured to the forward end of the truck is a worm gear 14 arranged in the form of a quadrant with the center of the king pin as its center. The worm gear may be conveniently connected at its opposite ends to the truck by means, such as bolts 15.

Mounted below the chassis of the trailer and rigid therewith are a plurality of beam members 16 having web portions 17 and flanges 18. Extending transversely of the beam members and projecting through elongated slots 19 in the webs thereof is a shaft 20 having a worm 21. The shaft is supported at opposite ends of the worm on bearings 22 which are slidably mounted on bottom flanges 18 of the beam members through which the shaft extends. This worm is engageable with the worm gear 14 and has the same arcuate contour.

Rotatably secured to the webs 17 of the beam members 16 by suitable clips or brackets 23 are rods 24 having screw thread connection with the bearings 22. The opposite ends of the rods 24 are formed with bevel gears 25 meshing with bevel gears 26 on a shaft 27 which is rotatably held in bearings or the like 28 rigid with the beam members 16. One end of the shaft 27 projects through the beam member at one side of the chassis and terminates in a crank or handle 29.

It will thus be seen that rotation of the shaft 27 will induce rotation of the screw rods 24 and thus cause bearings 22 to slide along the bottom flanges of the beam members whereby the shaft 20 and the worm 21 mounted thereon are caused to move in a direction substantially perpendicular to the axis of the shaft.

Accordingly when shaft 27 is rotated in one direction the worm 21 will be caused to move into engagement with worm gear 14, and when it is rotated in the opposite direction the worm will be caused to move out of engagement with the worm gear. When the worm is in engagement with the worm gear, rotation of the worm about its axis will induce pivoting or swiveling of the truck 2 with respect to the trailer.

Adjacent the worm gear, the truck is preferably provided with an upwardly extending lug or the like 30 adapted to engage transversely spaced parts of the trailer frame and thus limit or arrest pivoting or swiveling of the truck with respect to the trailer.

Mounted on shaft 20 is a reversible driving unit 31 of conventional design which may be electrically, hydraulically or air driven by any suitable means under the control of the truck driver. The part of the shaft which extends from the outer end of the driving unit, as indicated at 32, is journaled in a bearing 33 which is slidably mounted on the adjacent beam member of the trailer, like bearings 22. Longitudinal shifting or displacement of the shaft 20, may, of course, be prevented by suitable collars, such as indicated at 34.

When the truck and trailer are to be backed, hand shaft 27 is rotated in a direction for causing worm 21 to move into engagement with the worm gear 14. The truck driver may then cause the driving unit 31 to operate to rotate the worm 21 in the direction which will cause the truck to pivot or swivel in the desired direction with respect to the trailer. When the trailer is to be towed, the steering mechanism is rendered inoperative by moving the worm out of engagement with the worm gear by rotating the shaft 27 in the opposite direction and thereby permits free tracking of the trailer.

Those skilled in the art will appreciate that various modifications may be made in the details of construction here described without departing from the spirit and scope of the invention as defined in the appended claims.

What I claim is:

1. Mechanism for steering the trailer of an automotive power unit comprising a swiveled truck supporting a part of the trailer, a worm gear rigid with said truck, a worm rotatably mounted upon said trailer, rotatable means for sliding said worm in a direction longitudinally of the trailer into and out of engagement with said worm gear, said means also acting to maintain said worm in its position of operative engagement with said gear, and means for rotating said worm.

2. Mechanism for steering the trailer of an automotive power unit comprising a swiveled truck supporting a portion of the trailer, a quadrant worm gear rigid with the truck, a rotatable worm slidably mounted on the trailer for movement in a direction perpendicular to its axis whereby it may be selectively moved into and out of engagement with the worm gear, and means for moving said worm into and out of operative engagement with said worm gear, said means including a shaft journaled on the trailer and adapted upon being rotated to cause said movement of said worm.

3. Mechanism for steering the trailer of an automotive power unit comprising a swiveled truck supporting a portion of the trailer, a quadrant worm gear rigid with the truck, a rotatable worm slidably movable in a direction longitudinally of the truck cooperable with said worm gear, and means for selectively sliding said worm into and out of operative engagement with said worm gear, said means including bearing members for said worm slidable with respect to said trailer and a rotatable shaft journaled on the trailer for actuating said slidable bearing member.

4. Mechanism for steering the trailer of an automotive power unit comprising a swiveled truck supporting a portion of the trailer, a quadrant worm gear rigid with the truck, a rotatable shaft provided with a worm engageable with said quadrant, bearings slidably mounted on said trailer affording a support for said shaft, and a shaft on said trailer having means for causing said bearings to slide in a direction perpendicular to the axis of the shaft for selectively causing the worm to move into and out of operative engagement with the worm gear.

5. Mechanism for steering the trailer of an automotive power unit comprising a swiveled truck supporting a portion of the trailer, a quadrant worm gear rigid with the truck, a rotatable shaft provided with a worm engageable with said quadrant, means slidably mounted on said trailer affording bearings for said shaft, and rotatable means mounted on the trailer including screw threaded members engageable with said bearings for causing the bearings to slide in a direction perpendicular to the axis of the shaft so that said worm may be selectively moved into and out of engagement with the worm gear.

6. Mechanism for steering the trailer of an automotive power unit comprising a swiveled truck supporting a portion of the trailer, frame members extending longitudinally of said truck, a quadrant worm gear rigid with the truck, rotatable shaft means extending transversely of the trailer, said shaft means having a power unit and having a worm engageable with said worm gear, bearings for said shaft means slidable longitudinally on said frame members, and means engaging said bearings and rotatable with respect thereto for sliding said bearings longitudinally of the truck for selectively moving the worm into and out of operative engagement with the worm gear, said last named means including a rotatable shaft mounted on said frame members.

7. Mechanism for steering the trailer of an automotive power unit comprising a swiveled truck supporting a portion of the trailer, a quadrant worm gear rigid with the truck, and means for swiveling said truck, said means involving members rigid with said trailer having longitudinally extending slots, a rotatable shaft disposed within said slots, bearings for said shaft slidably mounted on said members, a power driven worm on said shaft, and means cooperating with said bearings for selectively moving said worm into and out of engagement with said worm gear.

8. Mechanism for steering the trailer of an automotive power unit comprising a swiveled truck supporting a portion of the trailer, a quadrant worm gear rigid with the truck, a plurality of members rigid with said trailer each having a bottom flange and an upright web portion provided with an elongated slot, a rotatable shaft disposed in the slots of said members, bearings for said shaft slidably mounted on said bottom flanges, a worm on said shaft engageable with said worm gear, and manually operable means for simultaneously sliding said bearings along said flanges so that the worm may be selectively moved into and out of engagement with the worm gear.

HARRY C. NUNES.

REFERENCES CITED

The following references are of record in the file of this patent:

UNITED STATES PATENTS

| Number | Name | Date |
| --- | --- | --- |
| 1,784,263 | Williams | Dec. 9, 1930 |
| 2,070,832 | Johnson | Feb. 17, 1937 |